Nov. 5, 1929.  L. A. BABCOCK  1,734,788
APPARATUS FOR STEMMING FRUITS
Filed July 30, 1926
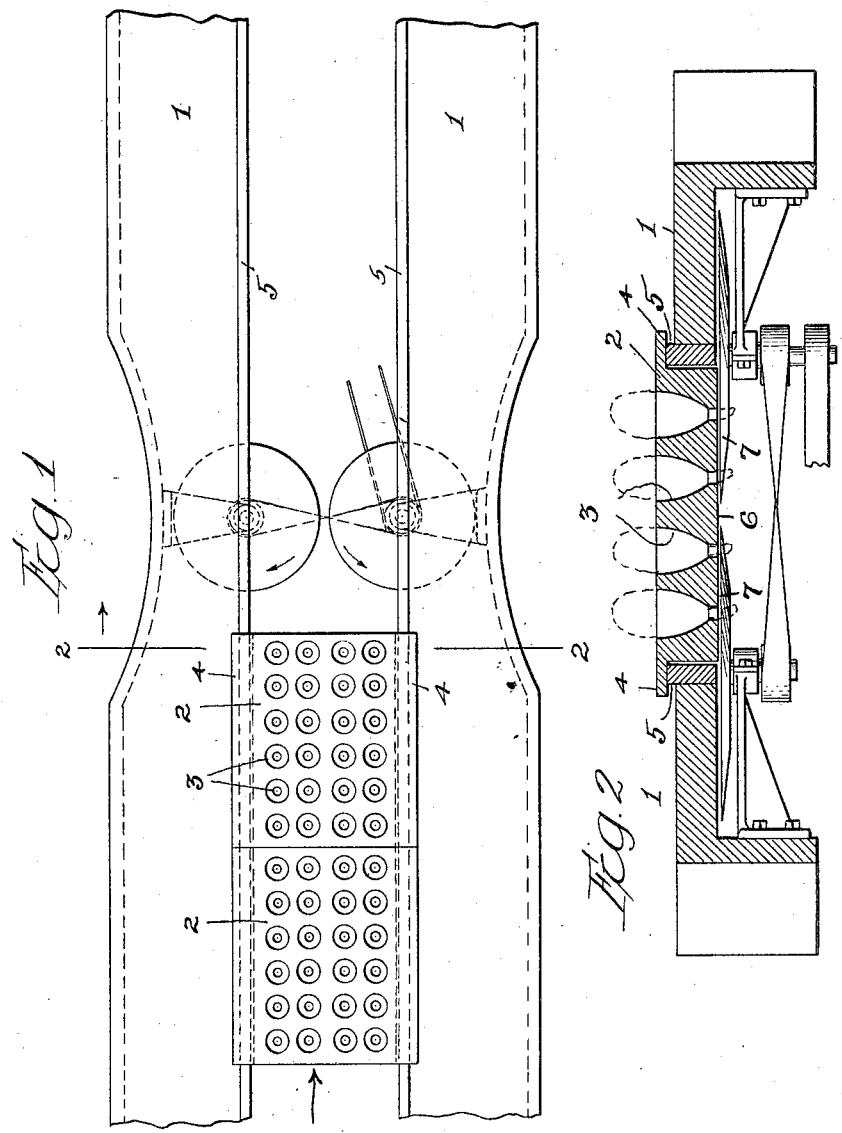

Patented Nov. 5, 1929

1,734,788

UNITED STATES PATENT OFFICE

LELAND A. BABCOCK, OF OAK PARK, ILLINOIS, ASSIGNOR TO SPRAGUE-SELLS CORPORATION, OF HOOPESTON, ILLINOIS

APPARATUS FOR STEMMING FRUITS

Application filed July 30, 1926. Serial No. 125,962.

This invention relates to an improved apparatus for treating fruits and is particularly adapted for cutting the stem ends from ripe figs during the process of canning.

The canning and preserving of figs is more or less of a recently developed industry, and therefore, there is not a very great array of equipment for handling the product in an efficient and rapid manner during the manipulations incident to preparation for canning.

One of the greatest needs seems to be an adaquate device for cutting the stems from the ripe figs rapidly and in a uniform manner. At present they are mostly snipped off by hand resulting in ununiform results, leaving some remaining stems too long and at times cutting too far into the body of the fig. At present most of the preserving is done in glass and this variation in the trimming of the stems does not produce the best appearing pack.

The stem of the fig is different than most other fruits in that it is really an extension and a part of the natural skin of the fig, hence it cannot be pulled off in the manner of other stem fruits, but must be cut off to produce a nice clean appearing product.

My invention comprises an apparatus for supporting a number of figs in spaced relation and substantially uniform arrangement, with the stem ends located in a substantially uniform plane; passing the figs when so placed into the operative zone of moving knives whereby the projecting stem ends are cleanly and uniformly severed. I mention here, moving knives, and have shown the apparatus with moving knives, but it is obvious that the apparatus would operate efficiently with fixed knives, with the figs supported as shown.

It is a principal object of my invention to provide an apparatus for cutting the stems from fruits, and especially figs, wherein the cutting will take place in a manner to produce a uniform appearing product.

It is a further object of my invention to provide an apparatus for cutting the stems from figs and other fruits, wherein the fruits are placed in trays and supported in a manner to present the stem ends to the action of severing apparatus.

It is a further object of my invention to provide an apparatus for removing the stems from fruits and especially figs, wherein a series of trays are provided, having pockets for supporting each fig separate from the others and permit the stem end to project from the tray and be moved in operative relation with severing means.

It is a further object of my invention to provide a series of trays having pockets in which the fruits to be stemmed are placed; in providing a trackway over which the trays may be passed successively; in providing severing means adjacent said trackway to intercept the projecting stems of the figs and cause their severence from the fig, as well as other means and apparatus incident to the operation of removing the stems from fruits.

With such objects in view as well as other objects evolved during the inception and development of the invention, I wish it understood that the several necessary elements and combinations constituting the same may be varied in their proportions and placement, their general arrangement and operative relation without departing from the nature of the invention, also that the described devices are simply embodiments of the invention which other structures might employ without departing from the purview of the invention, and I regard myself as entitled to such variations from the shown and described devices as fall within the scope and meaning of the claims hereto appended.

Reference being now had to the accompanying drawings a better and clearer understanding of the invention will be had. The drawings supplied herewith are more or less diagrammatic in character; are not necessarily made to scale and do not necessarily represent the best or the preferred engineering practices in the construction of apparatus of this nature, the invention as illustrated, however, is in a preferred form and clearly indicates how it may be applied in a concrete form or machine.

Figure 1 represents a plan view of an apparatus embodying my invention and clearly shows the manner of moving the trays along a trackway; the location of the severing means in relation to the placement of the figs and means for transmitting motion to the severing means.

Figure 2 is a sectional elevation on approximately the line 2—2 of Figure 1 looking in the direction of the arrow, and clearly shows the manner of supporting the figs with the stems projecting downward so they will intercept the severing means as they are moved along their path of travel.

The type of apparatus chosen to illustrate the application of my invention comprises a two part table, 1, having a runway formed by spacing the table parts. Trays 2 made of some light material, aluminum being suitable, are provided with pockets 3, so shaped that the figs are properly supported and held fairly rigid during the severing operation. In Fig. 2, the dotted lines represent figs placed and supported in the pockets. Each tray is provided with supporting flanges adapted to rest and ride along the rails 5, the flanges are designated by the numeral 4. The rails 5 are placed in true relation and form a straight and uniform path over which the trays may move. The under surfaces 6 of the trays 5 and the under surfaces of the flanges 4 are finished to uniform dimensions so that all trays are alike in this respect.

Severing means 7, in this instance shown as rotary cutters are located just under the tables 1 and with just a slight clearance below the bottoms of the trays 2. A clearance may be provided here as shown, or the cutters may be adjusted to have actual rubbing contact with the bottoms of the trays if such adjustment seems desirable. The cutters are given rotative movement in the direction of the arrows by means of belts or other suitable motion transmitting means.

The pockets in the trays are so shaped as to properly fit and support the size and grade of fig being handled, it being understood that the figs are graded for size and different batches of trays provided for the different grades so the fit of the figs in the pockets will be proper for the severing operation. The bottom of each pocket terminates in a through opening of a size best suited to support the stems from flexing during the severing operation, and on account of the slight clearance between the cutters and the bottoms of the trays each stem will be cleanly severed.

Rotary cutters are shown in the drawings but it is evident that a stationary cutter over which the trays would slide, would sever the stems in a satisfactory manner, and especially so if the stationary cutter were placed to give a shearing cut. I consider either arrangement within the scope of my invention. If the stationary cutter were used the uniform arrangement of the pockets in the trays could be dispensed with as the cutter would overlap the entire bottom of the trays. The rotary cutters have been shown with their near edges separated, and there is a slightly greater space between the two center rows of figs to take care of this separation. This separation of the two center rows in the trays could also be dispensed with if the rotary cutters were offset slightly so their edges would not touch, in which case they could be placed to cover the entire bottom of each tray.

I make the above reservations because it is clearly evident that many slight changes may be made in the apparatus as shown and still have an efficient operating device, and still be within the scope of the invention.

*Operation*

The operation of this apparatus is simple in the extreme. The trackway as shown is placed on substantially a level plane and the trays being filled with figs of a uniform grade and size are placed on the trackway, resting on their side flanges and are pushed along the trackway until they reach the severing station where an attendant may stand on either side and push them individually over the severing knives. The actual severing of the stems protruding through the bottoms of the trays is practically automatic, the mere movement of the trays over the cutters being sufficient for the operation. While I have shown a substantially level trackway it is obvious that the trackway may be inclined, especially at the severing station, even to the extent to permit the trays to slide along by gravity, the weight of the tray and figs being sufficient to overcome the resistance of the cutters against the stems and thereby effect an entirely automatic means of severing the stems.

What I claim as new and desire to secure by Letters Patent is:

1. An apparatus for stemming fruits comprising a series of members having recesses for the reception of fruits, and openings continuing through said members from said recesses to permit the stems to protrude therethrough, a fixed slideway over which said members may be moved successively, rotary cutting knives located under said slideway and adapted to sever the stems protruding below the said members.

2. An apparatus for stemming fruits comprising a plurality of manually movable trays, recesses in said trays for holding individual fruits, an opening at the bottom of each recess to permit the fruit stems to protrude through the trays and project beyond the under surface thereof free from any obstruction, rotary cutters arranged to just clear the under surfaces of said trays as they are manually moved into operation therewith, a slideway over which the trays may be successively moved to have the stems of the fruits contained in the recesses thereof removed.

In testimony whereof I affix my signature.

LELAND A. BABCOCK.